United States Patent
Look

(10) Patent No.: US 7,142,746 B2
(45) Date of Patent: Nov. 28, 2006

(54) OPTICAL BACKPLANE SYSTEM

(75) Inventor: Christopher M. Look, Pleasanton, CA (US)

(73) Assignee: Intellambda Systems, Inc., Fremont, CA (US)

( * ) Notice: Subject to any disclaimer, the term of this patent is extended or adjusted under 35 U.S.C. 154(b) by 0 days.

(21) Appl. No.: 11/220,630

(22) Filed: Sep. 6, 2005

(65) Prior Publication Data

US 2006/0051015 A1    Mar. 9, 2006

Related U.S. Application Data

(60) Provisional application No. 60/608,570, filed on Sep. 9, 2004.

(51) Int. Cl.
G02B 6/28    (2006.01)
G02B 6/00    (2006.01)

(52) U.S. Cl. .......................... 385/24; 385/134
(58) Field of Classification Search ......... 385/134–139
See application file for complete search history.

(56) References Cited

U.S. PATENT DOCUMENTS 5,513,293 A * 4/1996 Holland et al. ............. 385/134
5,712,942 A * 1/1998 Jennings et al. ............ 385/134
5,980,312 A * 11/1999 Chapman et al. ......... 439/540.1
6,335,992 B1 * 1/2002 Bala et al. .................... 385/17
2002/0048066 A1* 4/2002 Antoniades et al. ........ 359/128
2003/0091267 A1* 5/2003 Alvarez et al. ............... 385/16

* cited by examiner

Primary Examiner—Michelle Connelly-Cushwa
Assistant Examiner—Chris Chu
(74) Attorney, Agent, or Firm—Blakely, Sokoloff, Taylor & Zafman, LLP

(57)    ABSTRACT

An optical backplane system is described herein. In one embodiment, an exemplary system includes a backplane to interconnect multiple optical modules, multiple fiber interface modules (FIMs) having a back end inserted into multiple slots of the backplane respectively, each FIM having a front end to receive an incoming fiber carrying incoming optical signals and an outgoing fiber carrying outgoing optical signals from and to an optical network. The back end of the FIM extends the incoming and outgoing fibers to at least one of the multiple optical modules mounted via the backplane without significantly processing of the incoming and outgoing optical signals. Each of the fibers is capable of carrying multiple wavelengths of optical signals. Other methods and apparatuses are also described.

25 Claims, 15 Drawing Sheets

OPTICAL BACKPLANE SYSTEM

FIELD OF THE INVENTION

This application claims the benefit of U.S. Provisional Patent Application No. 60/608,570, filed Sep. 9, 2004, which is incorporated by reference herein in its entirety.

FIELD OF THE INVENTION

The present invention relates generally to fiber optics. More particularly, this invention relates to an optical backplane system.

BACKGROUND OF THE INVENTION

An optical backplane is a structure having a variety of connectors facilitating the interconnection and communication of different systems and components. More specifically, the optical backplane is configured for the interconnection of systems and components having high bandwidth optical interfaces. Conventional optical backplanes, however, also can include electrical connections and suitable interface circuitry for interconnecting systems and components having electrical interfaces.

Modules or components of a conventional optical backplane include a lot of interconnections at the front of the modules to connect with each other because the connections (e.g., fibers) may need to be shuffled, which may be performed within the specific modules. However, as the optical system is getting larger and complicated, there may not be enough space on the front to allow such interconnections. In addition, such a configuration limits the scalability of the system and may involve more human errors while wiring the modules. Furthermore, the wire or fiber shuffling within the modules may be more expensive.

SUMMARY OF THE INVENTION

An optical backplane system is described herein. In one embodiment, an exemplary system includes a backplane to interconnect multiple optical modules, multiple fiber interface modules (FIMs) having a back end inserted into multiple slots of the backplane respectively, each FIM having a front end to receive an incoming fiber carrying incoming optical signals and an outgoing fiber carrying outgoing optical signals from and to an optical network. The back end of the FIM extends the incoming and outgoing fibers to at least one of the multiple optical modules mounted via the backplane without significantly processing of the incoming and outgoing optical signals. Each of the fibers is capable of carrying multiple wavelengths of optical signals.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

An optical backplane system is described herein. In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may mean that two or more elements are in direct contact (physically, electrically, optically, etc.). However, "coupled" may also mean that two or more elements are not in direct contact with each other, but yet still co-operate or interact with each other.

Figure 1:
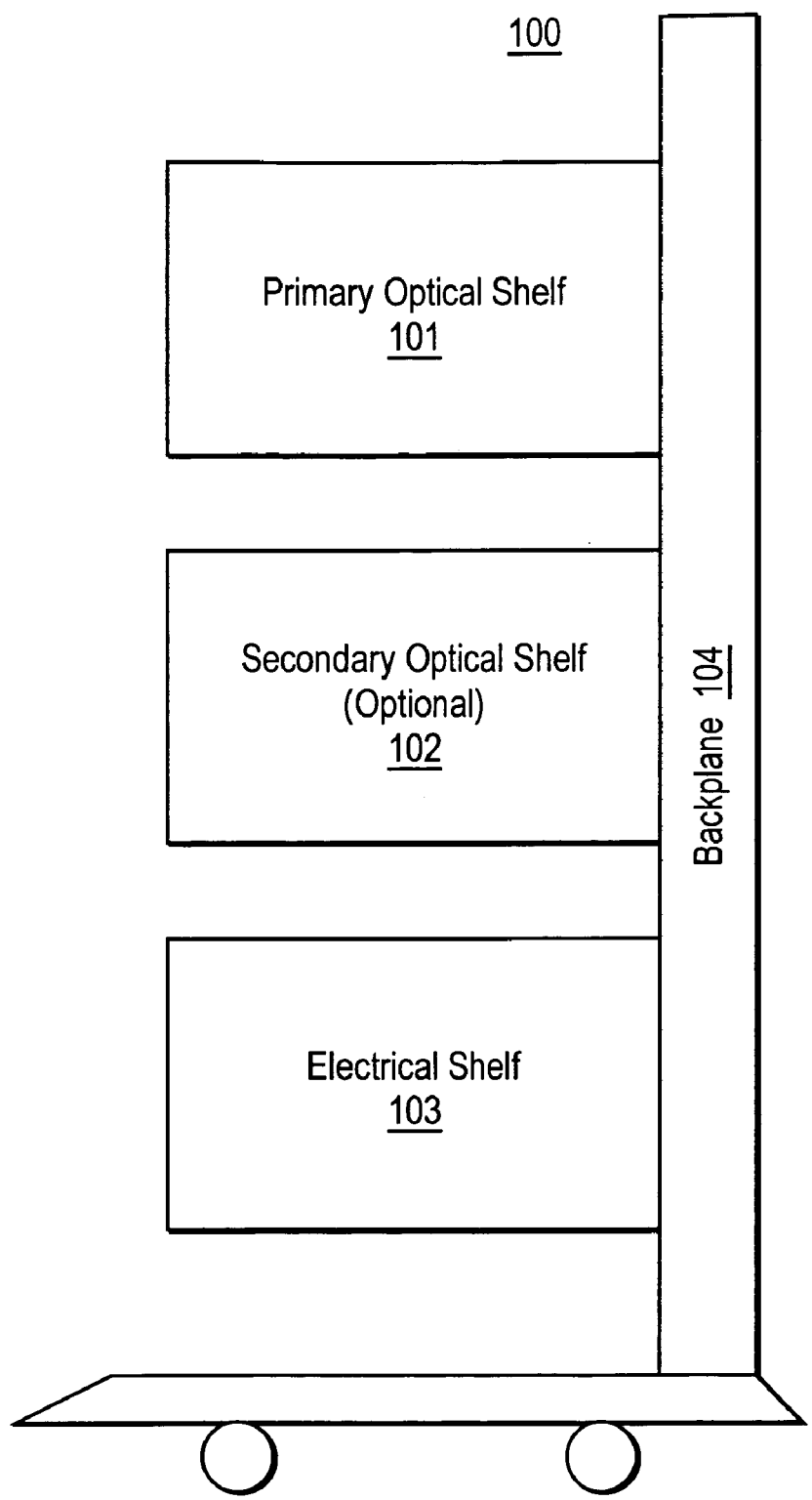
FIG. 1 is a block diagram illustrating an exemplary optical backplane system according to one embodiment of the invention.

FIG. 1 is a block diagram illustrating an exemplary optical backplane system according to one embodiment of the invention. Referring to FIG. 1, exemplary system 100 includes, but is not limited to, a primary optical shelf 101, an optional secondary optical shelf 102, and an electrical shelf 103 interconnected via a backplane 104. In one embodiment, the optical shelf 101 may include multiple optical modules inserted into multiple slots of backplane 104 and each of the optical modules may be individually removable from the respective slot of the backplane 104.

According to one embodiment, the optical modules inserted in the slots may be interconnected via multiple connections within the backplane 104. The connections within the backplane 104 may be shuffled using one or more connectors to a connection orientation that fits a particular module. As a result, the connection shuffling within a module has been greatly reduced. Since the connection interconnecting multiple modules are routed within the backplane, there are fewer connections at the front of the modules, except those need to be connected to an optical network, which leads to fewer human wiring errors.

Figures 2A, 2B:
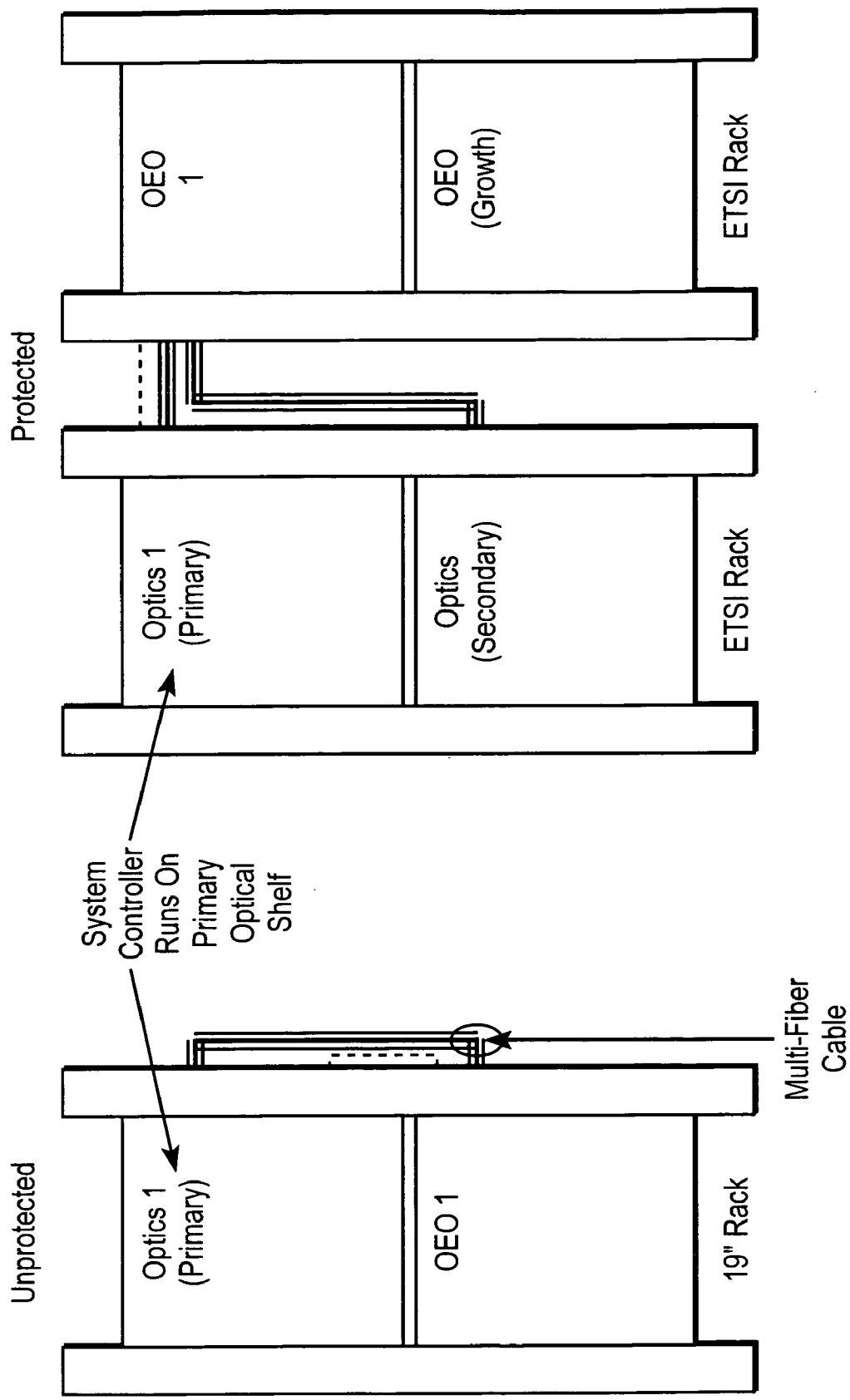
FIGS. 2A and 2B are block diagrams illustrating an exemplary optical backplane system according to an alternative embodiment of the invention.

In addition, according to a further embodiment, the exemplary system 100 may include connections for interconnecting other modules, such as those in the electrical shelf 103, via the backplane 104 or on the front, as shown in FIG. 2A. Alternatively, such connections may connect the exemplary system 100 with another backplane system as shown in FIG. 2B.

Figure 3:
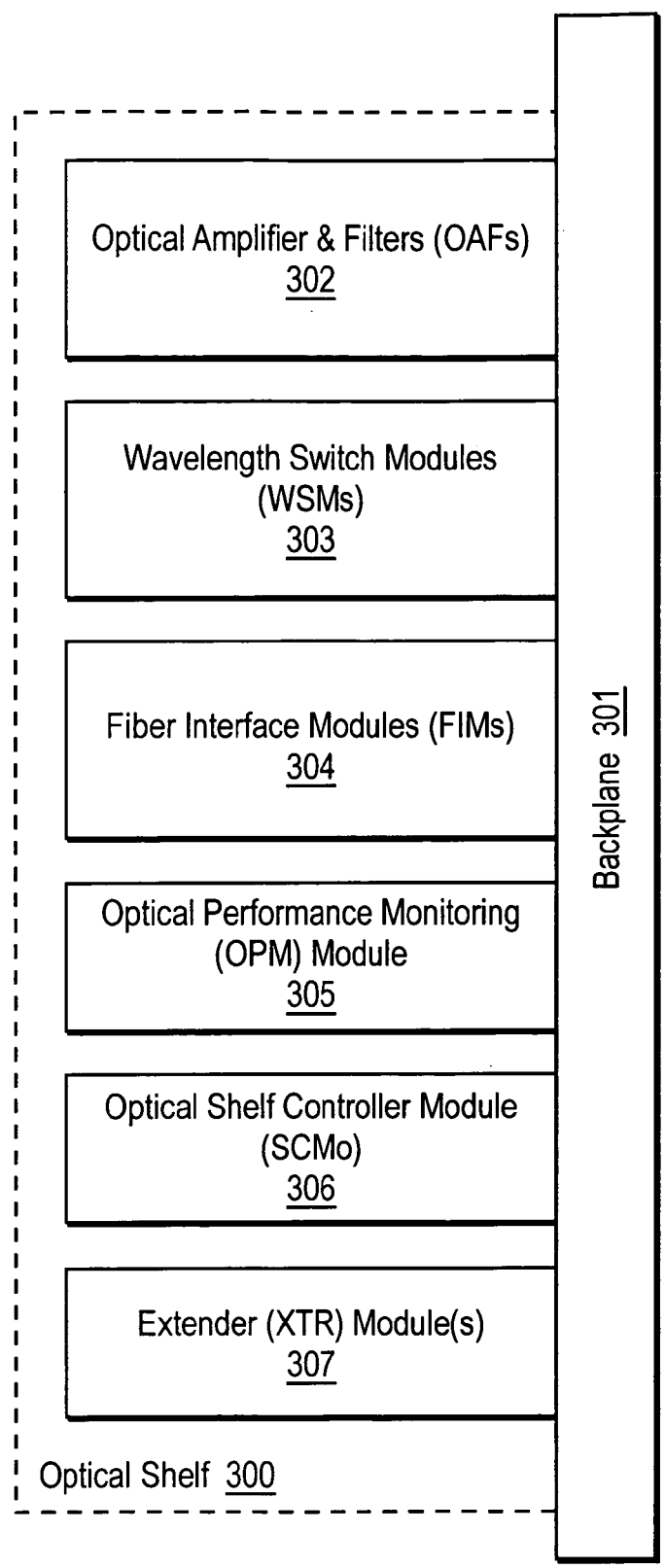
FIG. 3 is a block diagram illustrating an exemplary optical shelf of an optical backplane system according to one embodiment of the invention.

FIG. 3 is a block diagram illustrating an exemplary optical shelf of an optical backplane system according to one embodiment of the invention. Referring to FIG. 3, according to one embodiment, exemplary optical shelf 300 includes a backplane 301 to interconnect multiple optical modules, including, but is not limited to, one or more optical amplifier and filter (OAF) modules 302, one or more wavelength switch modules (WSMs) 303, one or more fiber interface modules (FIMs) 304, at least one optical performance monitoring (OPM) module 305, at least one optical shelf controller module (SCMo) 306 and at least one extender (XTR) module 307. The functionality of these optical modules will be described in details further below.

In one embodiment, each of the modules may be inserted in a slot of the backplane 301 and removable independently from the respective slot. Note that the arrangement of the modules shown in FIG. 3 is for illustration purpose only. Some of the modules may be mounted on the backplane 301 according to other configurations. For example, SCMo 306 and/or OPM 305 may be mounted on the backplane 301 in a slot arranged in a row with the OAFs 302. In one embodiment, the XTR 307 may have an interface physically compatible with the OAF module. As a result, XTR 307 may substitute an OAF. Other configurations may exist.

Figure 4:
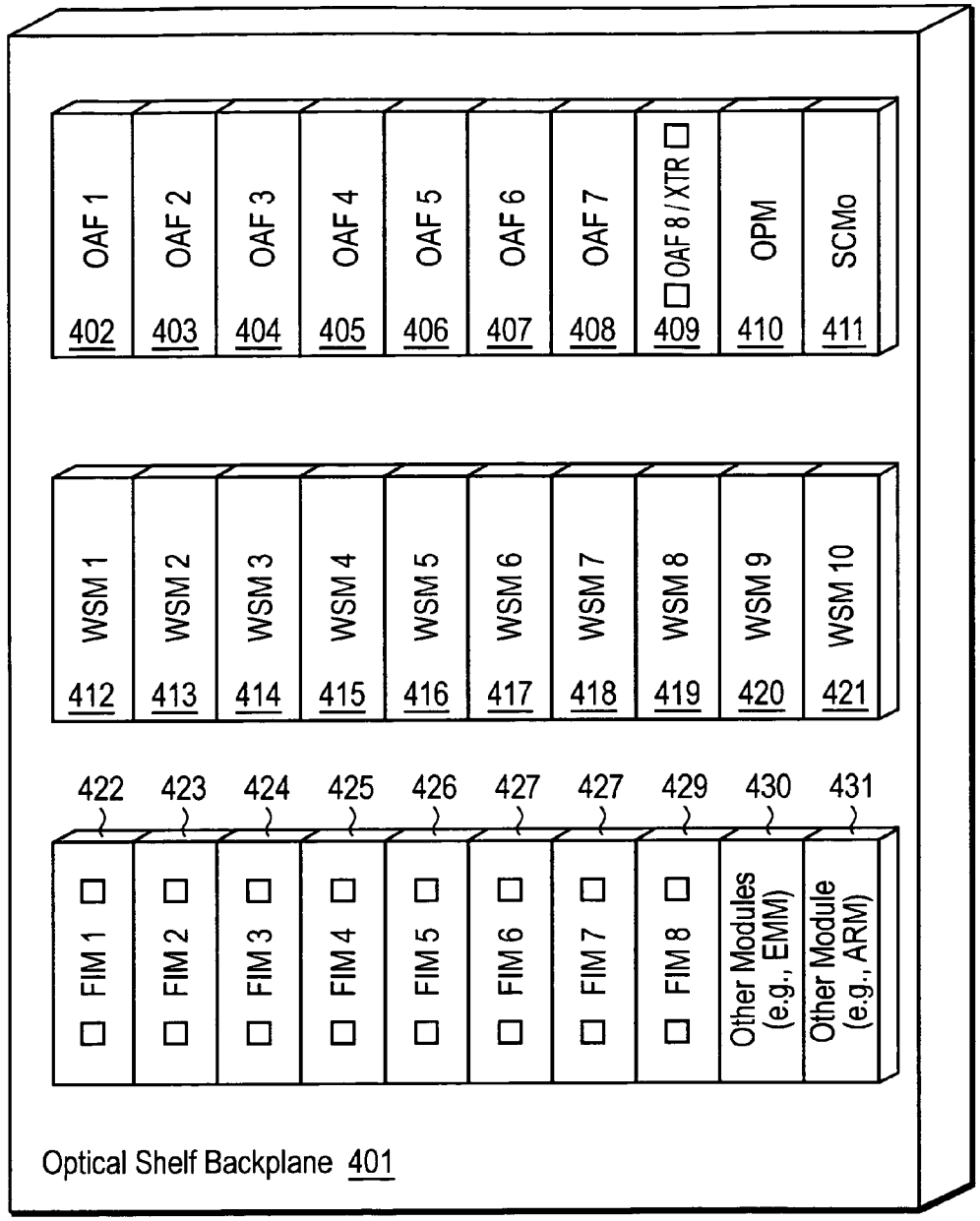
FIG. 4 is a block diagram illustrating an exemplary optical shelf of an optical backplane system according to another embodiment of the invention.

FIG. 4 is a block diagram illustrating an exemplary optical shelf of an optical backplane system according to another embodiment of the invention. For example, the exemplary optical shelf 400 may be a front view of an optical shelf. Referring to FIG. 4, in one embodiment, exemplary optical shelf 400 includes an optical backplane 401 for interconnecting multiple optical modules mounted on the backplane 401. The multiple optical modules may be mounted on the backplane according to a variety of configurations. The exemplary optical shelf 400 is shown for the illustration purposes only. Other configurations may be implemented without departing from the scope and spirit of the present application.

Referring back to FIG. 4, in this example, there are three rows of modules mounted on the backplane 401. In one embodiment, there are ten slots in each row. On the first row, according to a particular embodiment, there are multiple slots 402–409 that can be used for multiple OAFs, where the one of the slots, such as slot 409, may be substituted with an XTR module, which will be described further below. The remaining two slots 410–411 may be used by an OPM module and/or an optical shelf controller module (SCMo).

On the second row, according to one embodiment, there are also ten slots 412–421 on the backplane that can be used by ten SWMs, which will be described in details further below. On the third row, according to one embodiment, there are also ten slots 422–431. Eight of the ten slots 422–429 may be used by eight FIMs, while the remaining two slots 430–431 may be used other modules, such as, for example, an Ethernet management module (EMM) and/or an alarm interface module (ARM).

Note that the optical modules shown in FIG. 4 are for illustration purposes only and they are not limited to the particular configuration and/or order shown in FIG. 4. It will be appreciated that the optical modules may be arranged according to a variety of different configurations. Also note that, more or less modules may be implemented dependent upon the optical network requirements. More or less rows and/or slots per row may be implemented.

Figure 5:
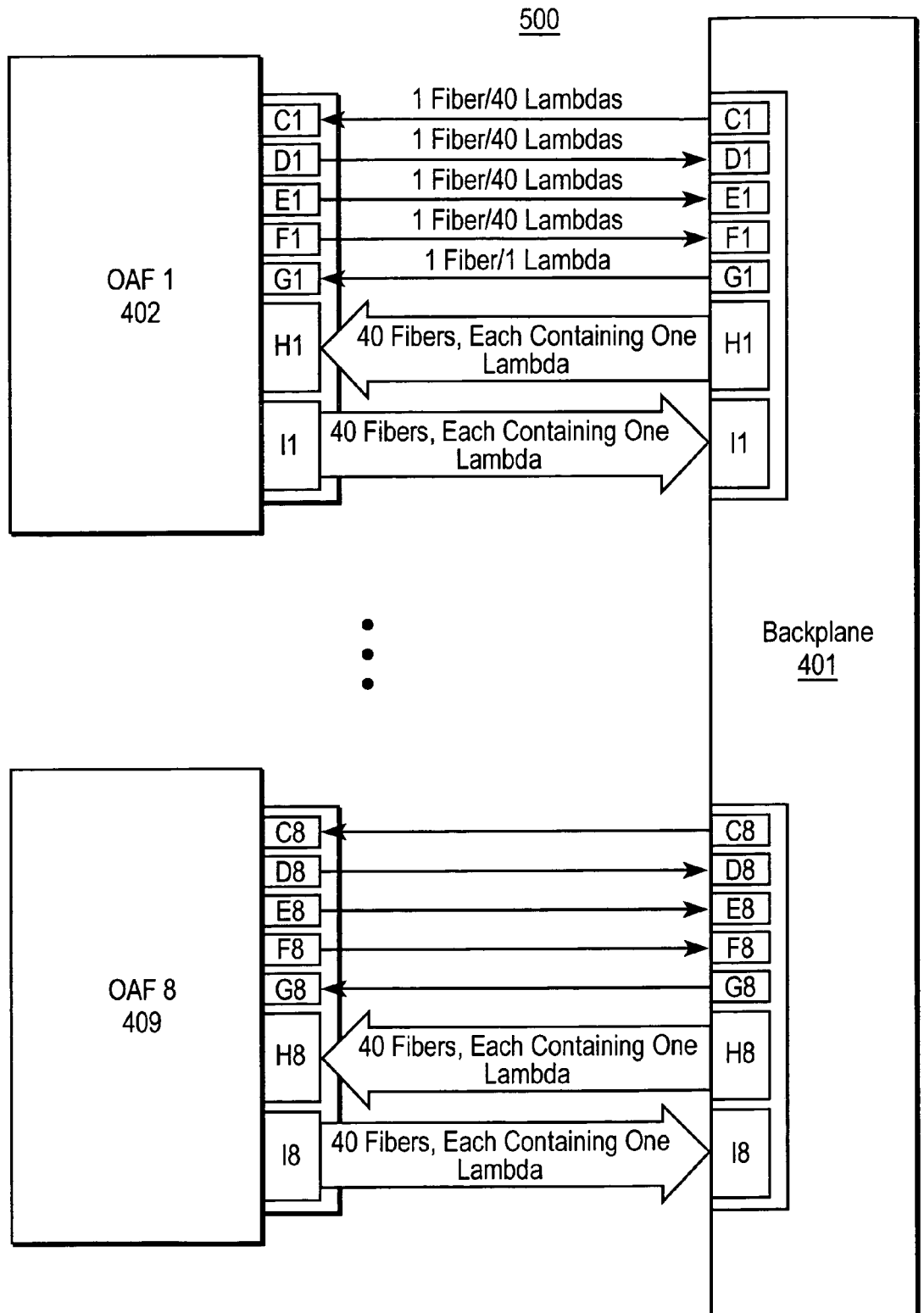
FIG. 5 is a block diagram illustrating an exemplary interface between an OAF and a backplane according to one embodiment of the invention.

FIG. 5 is a block diagram illustrating an exemplary interface between an OAF and a backplane according to one embodiment of the invention. For the illustration purposes, some of the references are maintained as substantially the same as those shown in FIG. 4. For example, OAFs 402–409 may be implemented as OAFs 402–409 of FIG. 4. In one embodiment, each of the OAFs 402–409 includes multiple interfaces (also referred to as ports, connectors, etc.) to interface with other modules mounted on the backplane 401.

For example, according to one embodiment, OAF 402 includes port C1 to receive an incoming fiber from a corresponding port C1 of backplane 401. The arrow between port C1 of OAF 402 and port C1 of backplane 401 is used to indicate the optical signal traffic direction. For the illustration purposes, the port references are maintained to indicate that a particular port is coupled to some other ports having the same reference. For example, port C1 of OAF 402 may be, when inserted into the backplane 401, coupled to port C1 of the backplane. Port C1 of the backplane 401 may be coupled to other ports of the backplane 401 having the same reference (e.g., port C1), such as, for example, port C1 of backplane 401 of FIG. 9.

For the illustration purposes, ports C1–C8 are referred to as port C in general, where port C of the first module is referred to as C1 and port C of the second module is referred to as C2, and so on. Throughout the present application, port C is used to refer to any of the Cx, such as C1–C8 if there are eight modules. For example, port C of OAF 402 may be referred to as port C1 since OAF 402 is the first module. Similar illustrations may be used for other ports, such as ports A–B and D–M.

In one embodiment, port C of each OAF may receive incoming fiber having multiple wavelengths of optical signals received from an optical network, forwarded from a corresponding FIM via the backplane 401. For example, referring to FIG. 4, port C of OAF 402 may receive an incoming fiber from FIM 422, which receives the incoming fiber at the front end. In a typical wavelength division multiplexing (WDM) network, a fiber may carry up to 40 wavelengths (also referred to as lambdas). Alternatively, there may be up to 80 wavelengths in a DWDM (dense WDM) network. It will be appreciated that more or less wavelengths may be implemented within a fiber or a path.

Similarly, each OAF may further include a port D to transmit multiplexed optical signal (e.g., single fiber carrying 40/80 wavelengths) to the corresponding FIM which redirect the outgoing signals to the optical network. In addition, each OAF may include an interface, including port E and port F to transmit the incoming and outgoing multiplexed optical signals to an OPM, such as, for example, OPM 410 of FIG. 4, for the diagnostic purposes. In one embodiment, each OAF may further include a port G that receives a diagnostic signal from the OPM to diagnose the respective OAF. In one embodiment, such a diagnostic signal is carried within a single fiber having one wavelength.

Furthermore, each OAF may multiplex multiple individual wavelengths received from other optical modules, such as WSMs 412–421 of FIG. 4, via the backplane 401 into multiplexed optical signals, which may be carried within a single fiber. Similarly, each OAF may demultiplex the multiplexed optical signals into multiple individual wavelengths. According to one embodiment, each OAF includes a port H that receives the demultiplexed signals via the backplane 401 and a port I that transmits the demultiplexed optical signals to other modules via the backplane. In one embodiment, the demultiplexed signals are carried via multiple fibers and each fiber carries one wavelength. Thus, in a WDM network, there are 40 fibers coupled to port H and 40 fibers coupled to port I. Alternatively, in a DWDM network, there may be up to 80 fibers each coupled to ports H and I.

It will be appreciated that more or less wavelengths (e.g., more or less fibers) may be implemented dependent upon the specific configuration. Note that the interfaces between an OAF and the backplane are not limited to those shown in FIG. 5, other interfaces, such as, for example, interfaces to SCMo and/or Ethernet interfaces, may be implemented.

Figure 6:
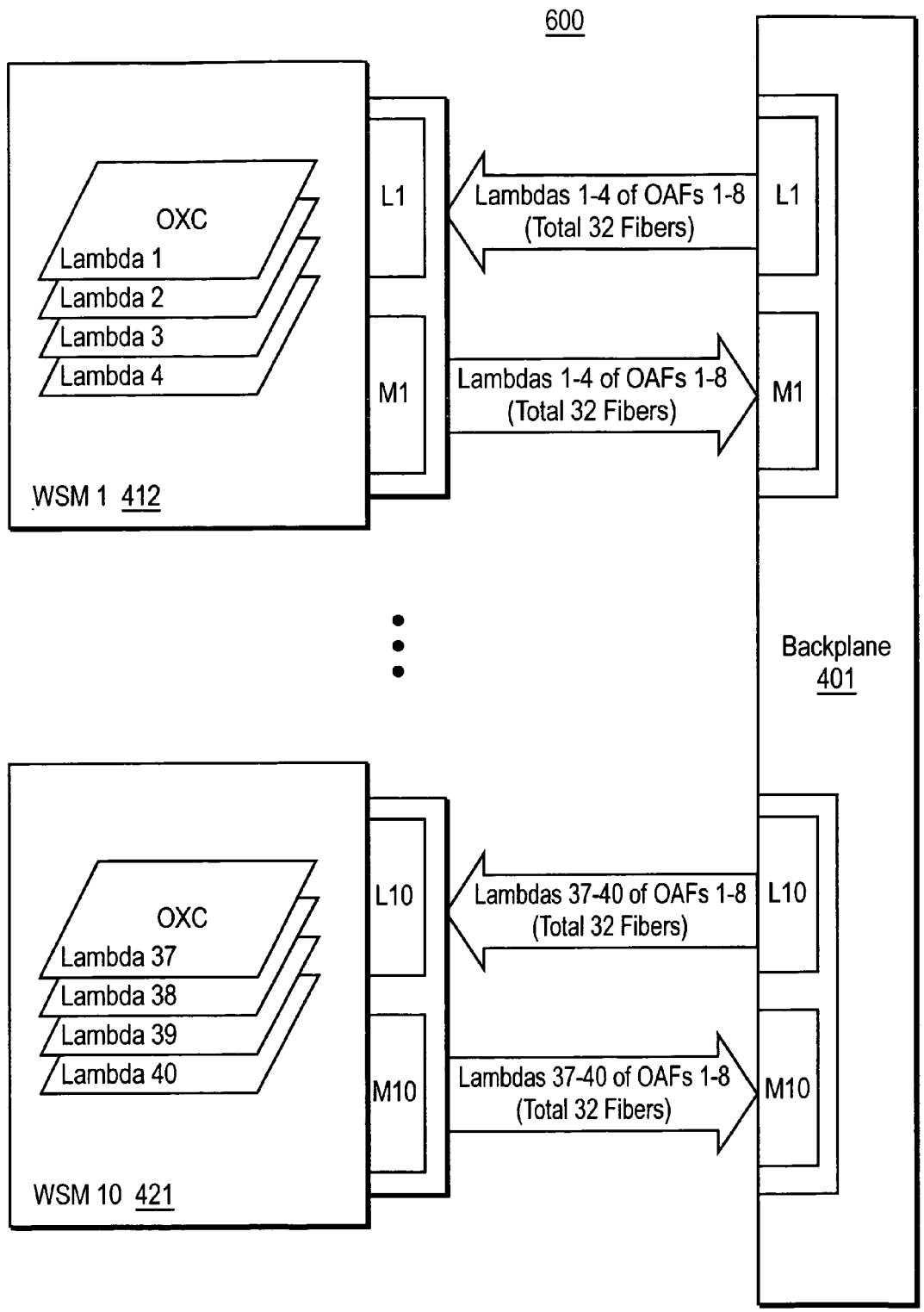
FIG. 6 is a block diagram illustrating an exemplary interface between a WSM and a backplane according to one embodiment of the invention.

FIG. 6 is a block diagram illustrating an exemplary interface between a WSM and a backplane according to one embodiment of the invention. For the illustration purposes, some of the references are maintained as substantially the same as those shown in FIG. 4. For example, WSMs 412–421 may be implemented as WSMs 412–421 of FIG. 4. In one embodiment, each of the WSMs 412–421 includes multiple interfaces (also referred to as ports, connectors, etc.) to interface with other modules mounted on the backplane 401.

In one embodiment, each of the WSMs includes multiple optical cross connects (OXCs) to perform optical wavelength switching operations. Each of the OXCs handles one wavelength (also referred to as lambda). In a particular embodiment, each WSM includes four OXCs to perform wavelength switching operations for four wavelengths (e.g., four lambdas). For example, the first WSM handles lambdas 1–4 and the second WSM handles lambdas 5–8, while the last WSM handles lambdas 37–40. More or less WSMs may be implemented dependent upon the number of wavelengths to be handled.

In one embodiment, each WSM includes a port L that receives multiple lambdas from each of the OAFs, such as OAFs 402–409 of FIG. 4. In a particular embodiment, the port L of each WSM receives four lambdas from each OAF, where each lambda is carried within an individual fiber. Thus, total 32 fibers are received by the port L of each WSM, assuming there are eight OAFs in the system. Similarly, on the outgoing direction, each WSM includes port M that transmits four lambdas to each OAF, a total of 32 fibers.

Note that the interfaces between a WSM and the backplane are not limited to those shown in FIG. 6, other interfaces, such as, for example, interfaces to SCMo and/or one or more add/drop multiplexers (ADMs), may be implemented.

Figure 7:
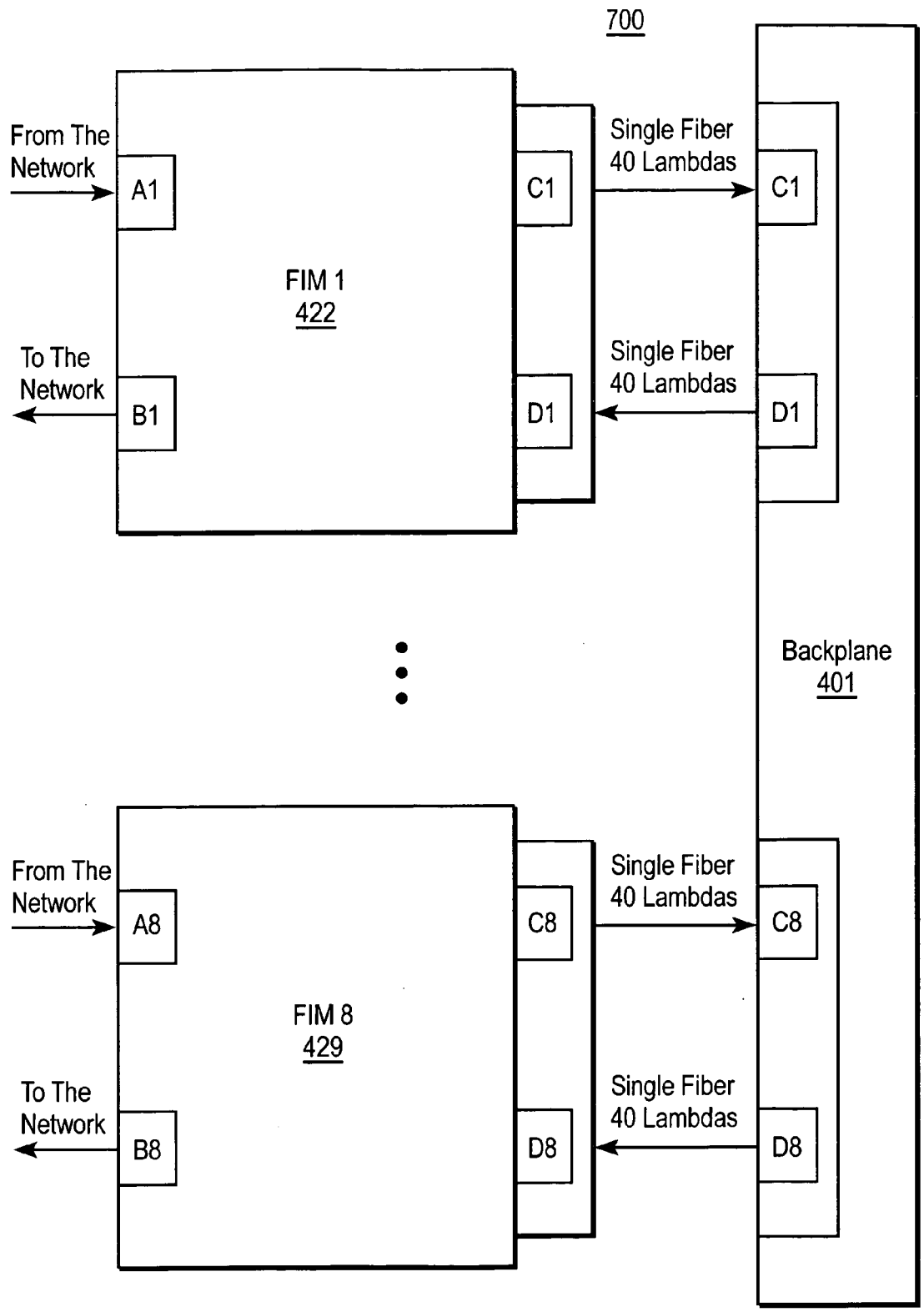
FIG. 7 is a block diagram illustrating an exemplary interface between a FIM and a backplane according to one embodiment of the invention.

FIG. 7 is a block diagram illustrating an exemplary interface between a FIM and a backplane according to one embodiment of the invention. For the illustration purposes, some of the references are maintained as substantially the same as those shown in FIG. 4. For example, FIMs 422–429 may be implemented as FIMs 422–429 of FIG. 4. In one embodiment, each of the FIMs 422–429 includes multiple interfaces (also referred to as ports, connectors, etc.) to interface with other modules mounted on the backplane 401.

Referring to FIG. 7, according to one embodiment, each FIM includes a front end and a back end. The back end is used to insert into a slot of the backplane 401. The front end may be operated by a user. In one embodiment, the front end includes port A and port B that an incoming fiber and an outgoing fiber may be plugged into by the user. The incoming and outgoing fibers plugged into the ports A and B are coupled to an optical network. Each of the incoming and outgoing fibers carrying multiple wavelengths of optical signals. For example, in a WDM network, each fiber carries up to 40 wavelengths, while in a DWDM network, each fiber may carry up to 80 wavelengths. More or less wavelength may be carried within a single fiber.

In addition, the back end of each FIM includes a port C and port D to extend the incoming fiber and outgoing fiber to the backplane 401, through which the incoming fiber and outgoing fiber may reach other modules mounted on the backplane 401, such as, for example, OAFs 402–409 of FIG. 4. As a result, a user may simple plug in or remove the incoming and outgoing fibers through ports A and B at the front end without having to reach the back end of the FIM or the backplane.

Figure 14A:
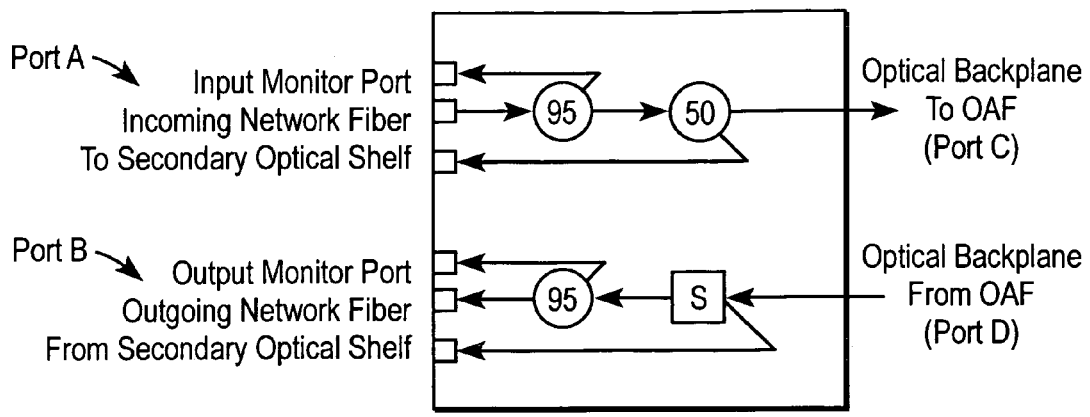
FIGS. 14A and 14B are block diagrams illustrating an exemplary FIM according to certain embodiments of the invention.
Figure 14B:
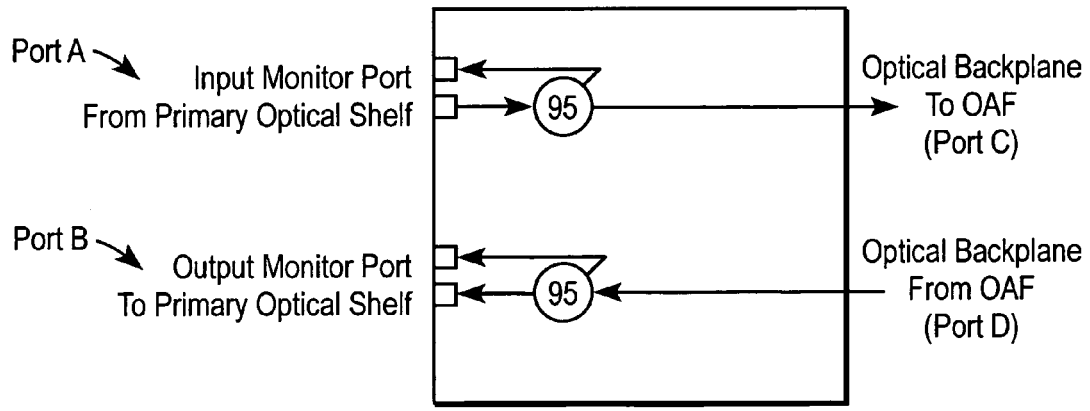

Furthermore, each FIM may further include one or more test points (not shown) for user diagnosis and testing purposes. Note that, according to certain embodiments, a FIM may simply an extended card or a pass through card that extends the incoming and outgoing fibers without performing significant processing operations as shown in FIG. 14B. Alternatively, a FIM may include some sort of protections as shown in FIG. 14A.

Figure 8:
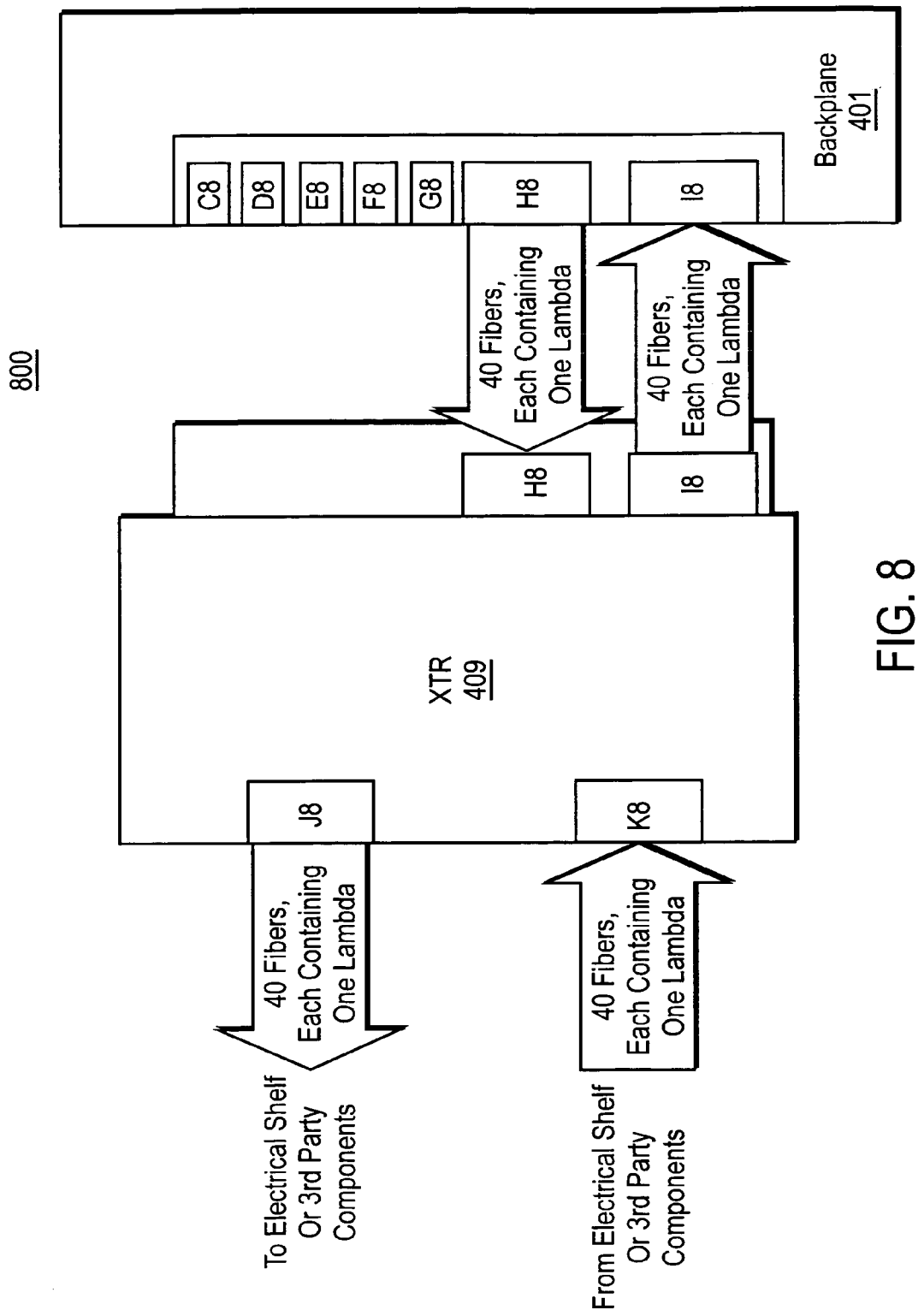
FIG. 8 is a block diagram illustrating an exemplary interface between an XTR module and a backplane according to one embodiment of the invention.

FIG. 8 is a block diagram illustrating an exemplary interface between an XTR module and a backplane according to one embodiment of the invention. For the illustration purposes, some of the references are maintained as substantially the same as those shown in FIG. 4. For example, XTR 409 may be implemented as XTR 409 of FIG. 4. In one embodiment, XTR 409 includes multiple interfaces (also referred to as ports, connectors, etc.) to interface with other modules mounted on the backplane 401.

In one embodiment, XTR 409 may be used to extend the demultiplexed optical signals to other modules coupled to the backplane 401, or alternatively, to other backplane systems. In one embodiment, XTR 409 includes a front end and a back end. The back end of the XTR 409 includes ports H and I for receiving and transmitting demultiplexed optical signals. Each of the demultiplexed optical signals may be carried within an individual fiber. That is, one fiber carries one wavelength. Thus, each of ports H and I can be used to accept up to 40 fibers in a WDM network and up to 80 fibers in a DWDM network. More or less fibers may be used dependent upon number of wavelengths implemented.

According to one embodiment, the back end of the XTR 409 are physically compatible with a back end of an OAF, excluding ports C, D, E, F, and G. As a result, XTR 409 may be swapped into a slot that an OAF normally inserted into, as shown in FIG. 4. Although XTR is shown to swap with an OAF at the last slot, it is not limited to the last slot. An XTR may be swapped with any of the OAFs. Furthermore, more than one XTR may be used.

Referring back to FIG. 8, the front end of the XTR 409 includes ports J and K to extend the demultiplexed optical signals to other modules, such as, for example, the electrical shelf or third party modules of the same backplane system or different backplane systems. Other interfaces or ports may be implemented.

Figure 9:
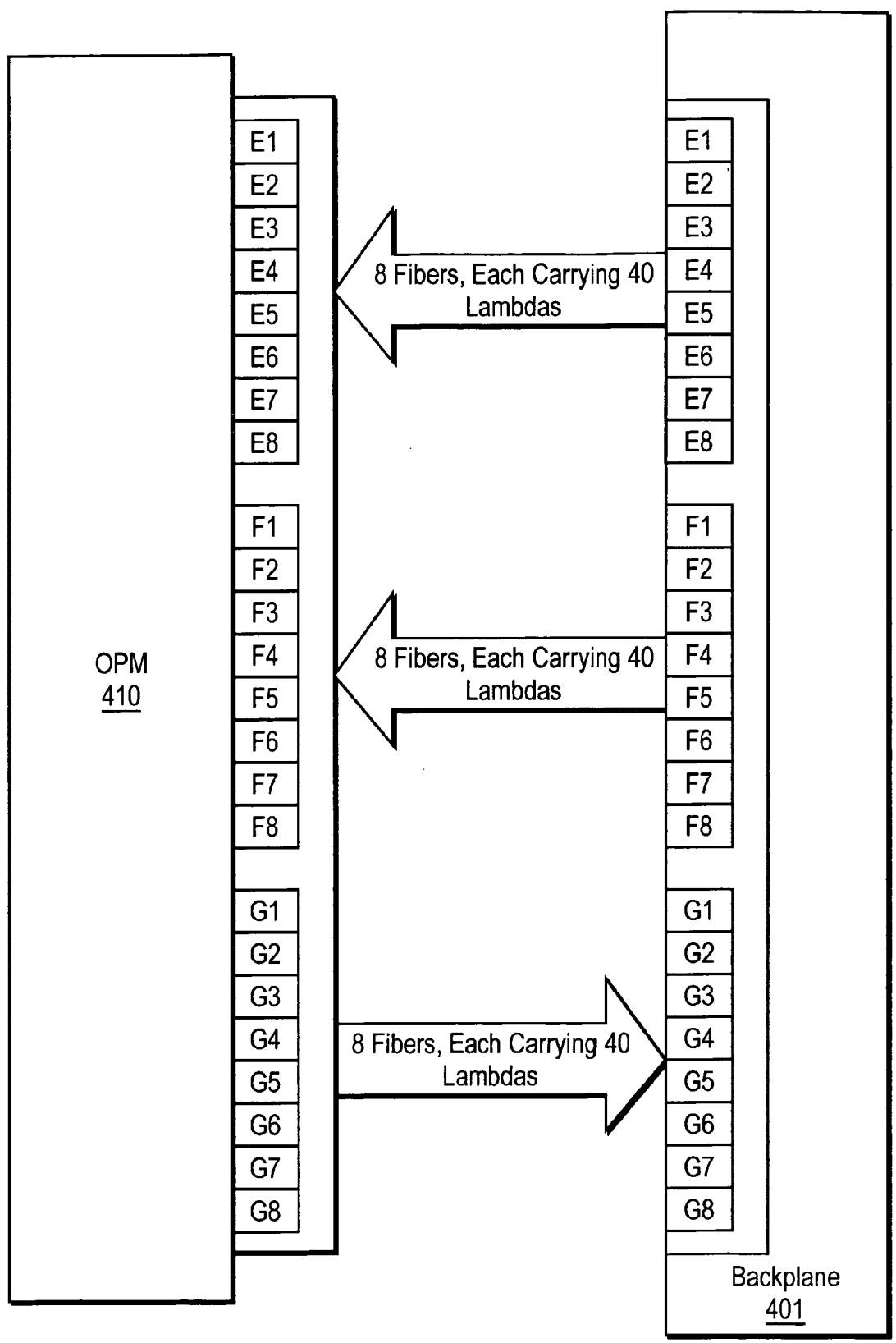
FIG. 9 is a block diagram illustrating an exemplary interface between an OPM module and a backplane according to one embodiment of the invention.

FIG. 9 is a block diagram illustrating an exemplary interface between an OPM module and a backplane according to one embodiment of the invention. For the illustration purposes, some of the references are maintained as substantially the same as those shown in FIG. 4. For example, OPM 410 may be implemented as OPM 410 of FIG. 4. In one embodiment, OPM 410 includes multiple interfaces (also referred to as ports, connectors, etc.) to interface with other modules mounted on the backplane 401.

Referring to FIG. 9, the OPM 410 includes E ports, such as E1–E8 if there are eight OAFs, coupled to the port E of each of the OAFs via the backplane 401. Similarly, OPM 410 includes F ports and G ports that are coupled to port F and port G of each OAFs via the backplane 401. Other interfaces, such as, for example, interfaces to SCMo may be implemented.

Figure 10:
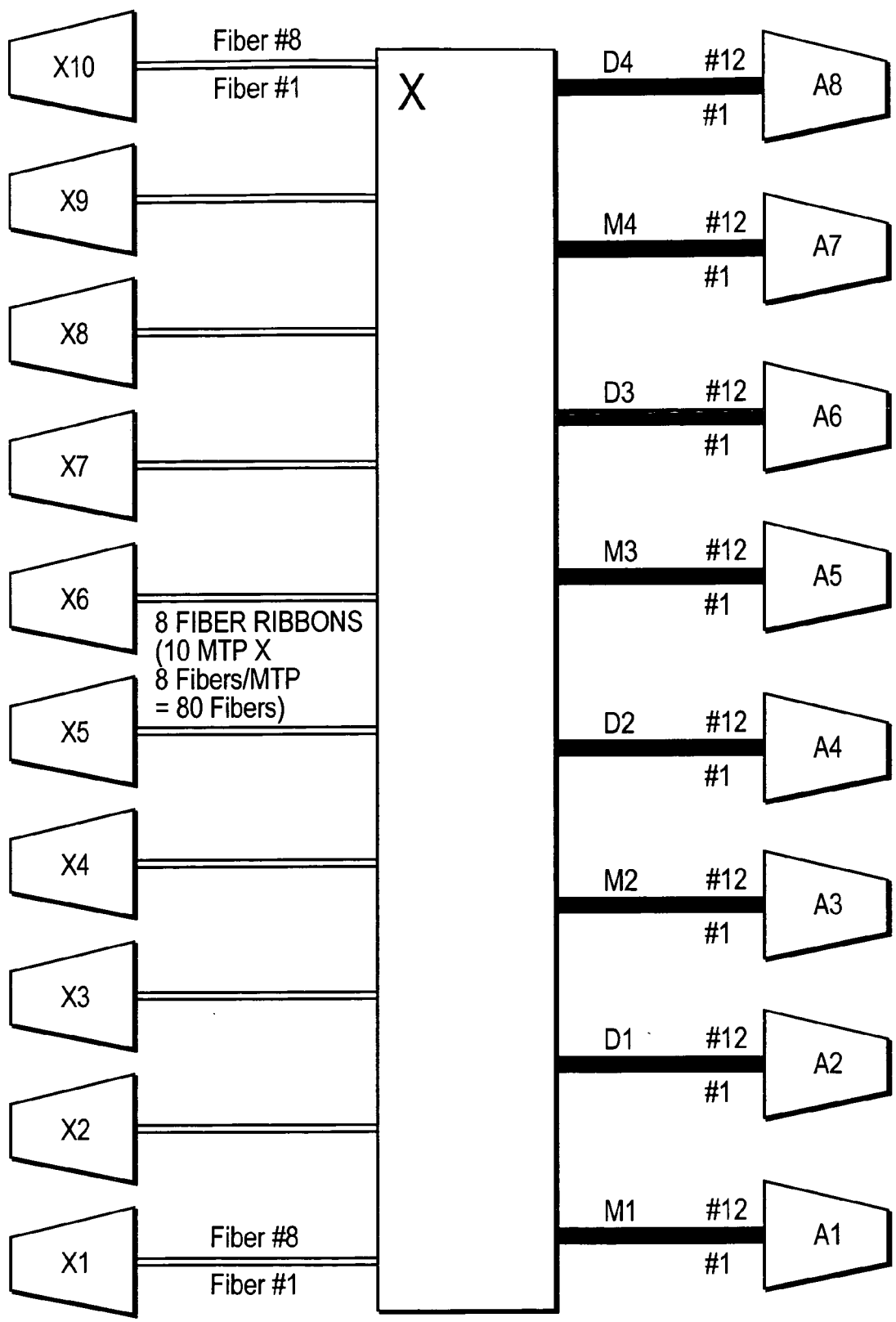
FIGS. 10 and 11 are block diagrams illustrating certain types of connectors that may be used in the interfaces according to certain embodiments of the invention.
Figure 11:
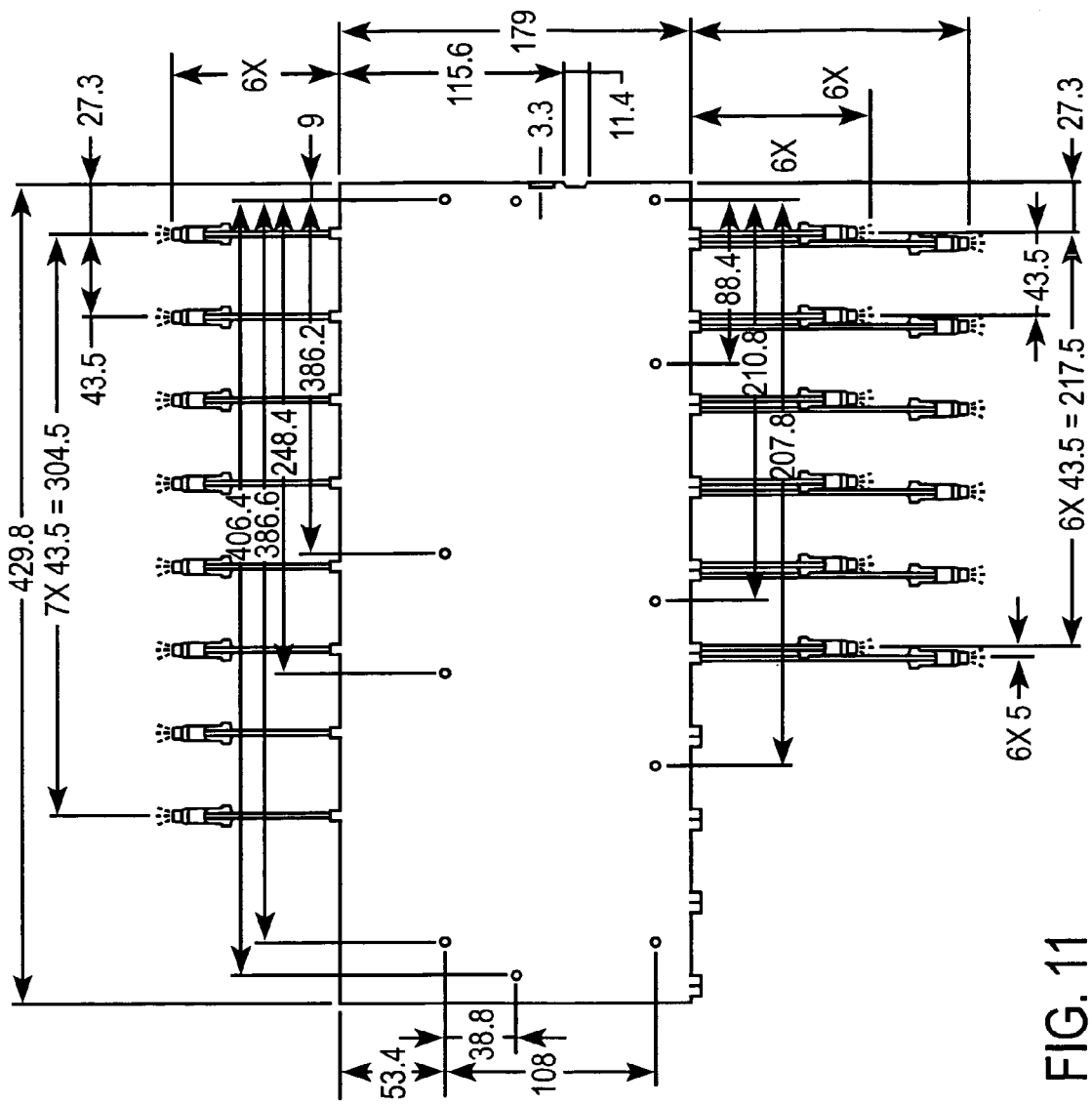

The interfaces or ports of the above described modules may be implemented using certain connectors or devices that can manipulate and/or manage the fibers, including shuffling of the fibers. FIGS. 10 and 11 are block diagrams illustrating certain types of connectors that may be used in the interfaces according to certain embodiments of the invention.

Figure 12:
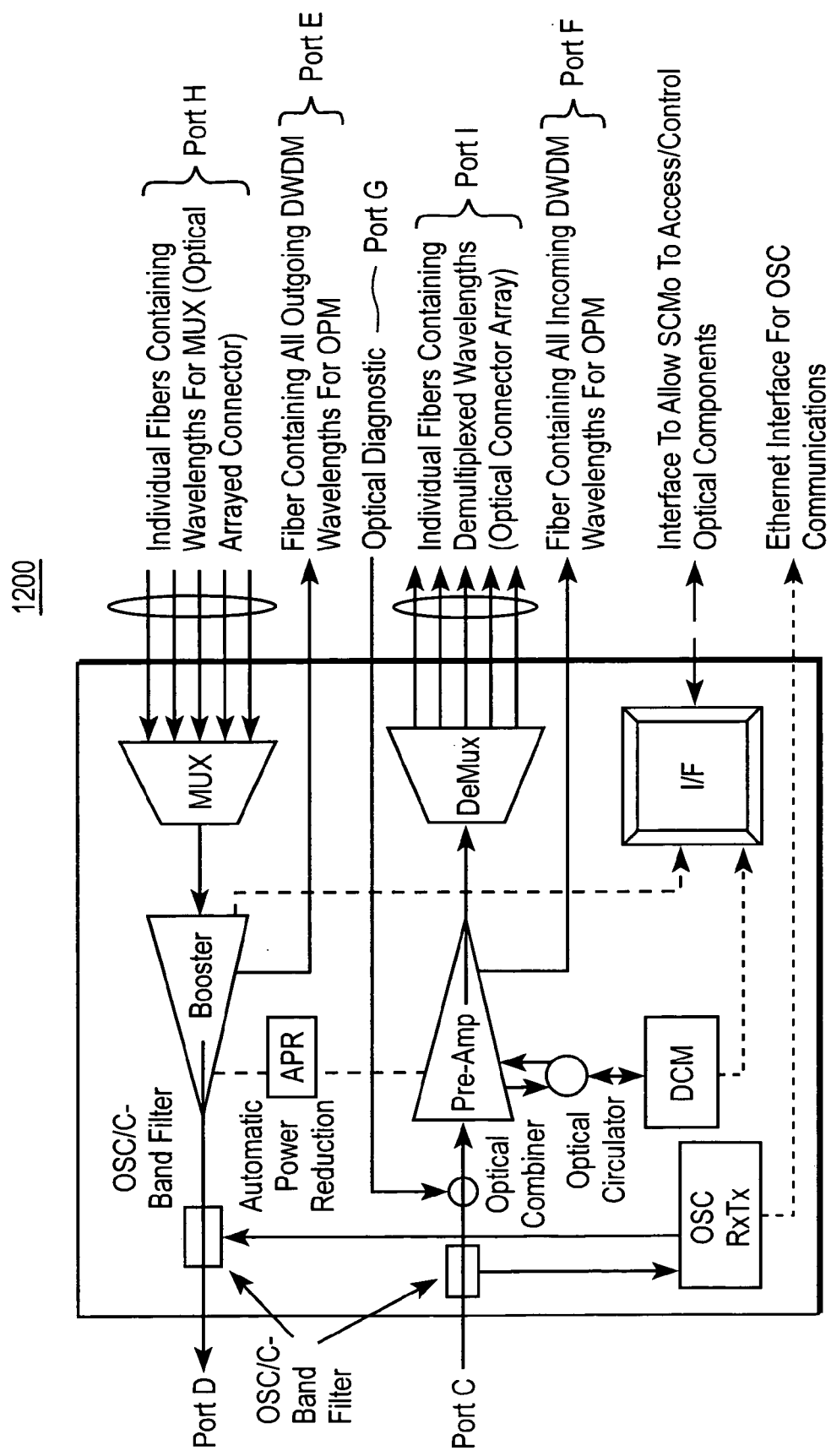
FIG. 12 is a block diagram illustrating an exemplary OAF according to one embodiment of the invention.

FIG. 12 is a block diagram illustrating an exemplary OAF according to one embodiment of the invention. The exemplary OAF may be implemented as any one of OAFs 402–409 of FIG. 4. In one embodiment, the exemplary OAF 1200 deals with all the WDM or DWDM multiplexing aspects of a particular network fiber. In the incoming direction, it pre-amplifies the incoming multiplexed WDM or DWDM signals and fixes pulse distortion due to chromatic dispersion prior to demultiplexing them down to individual wavelengths (channels). In the outgoing direction, it combines the individual channels and boosts the multiplexed WDM or DWDM signal prior to sending to the next node.

The Optical supervisory channel (OSC) may be used to convey signaling and other overhead information between nodes without the need for an external IP network. This signal is outside the gain bandwidth of the optical amplifier and must be tapped off before amplification by the OSC/C-band filters. It may be possible to utilize a custom optical amplifier that incorporates the OSC/C-band filter to reduce space and manufacturing costs. The OSC could also be used as a management interface if required, but currently expect that any management interface (for SNMP, telnet, FTP, etc.) would be through the 10/100 Ethernet interfaces on the shelf controller module (e.g., SCMo 411 of FIG. 4).

The purpose of the Pre-Amp is to compensate for the fiber loss. Since the distance to the upstream node will vary from installation to installation, this amplifier must automatically adjust its gain. The amplifier provides an optical tap that allows the optical signal to be monitored unobtrusively. The tapped signal is sent to the Optical Performance Monitor (OPM) module for analysis.

The pre-amp is a special type of optical amplifier that provides facility for a mid-stage access and can adjust gain for varying fiber lengths. For noise reasons, it is desirable to incorporate loss elements within the mid-stage. The function that we will bury in the mid-stage of the pre-amp is the tunable Dispersion Compensation Module (DCM).

DWDM signals come in on a fiber and will have signal distortion resulting from chromatic dispersion compensated by the DCM. The DCM operates on all the optical channels simultaneously in the optical domain. The DCM is a 'reflective' device and requires an optical circulator to separate the incoming from the compensated light. The form and magnitude of the DC will depend on the type of fiber and the distance to the upstream node—i.e. it will vary from node to node. The purpose of the DCM is to undo the pulse distortion caused by the chromatic dispersion of the fiber.

The signal is then sent to a demultiplexer AWG stage that will break apart the DWDM signals into their individual wavelengths. It is important that the demux have filter characteristics to allow the signal to pass through a cascade of such filters without significant distortion due to the filter roll-off. Drift in the center frequency of the source laser with respect to the center frequency of the filter cascade must be tightly controlled. There will be 40 individual channels being produced by the demultiplexed stage. Transporting these fibers around to the switch modules is tricky and will require the use of low loss, rugged fiber arrays.

Figure 13:
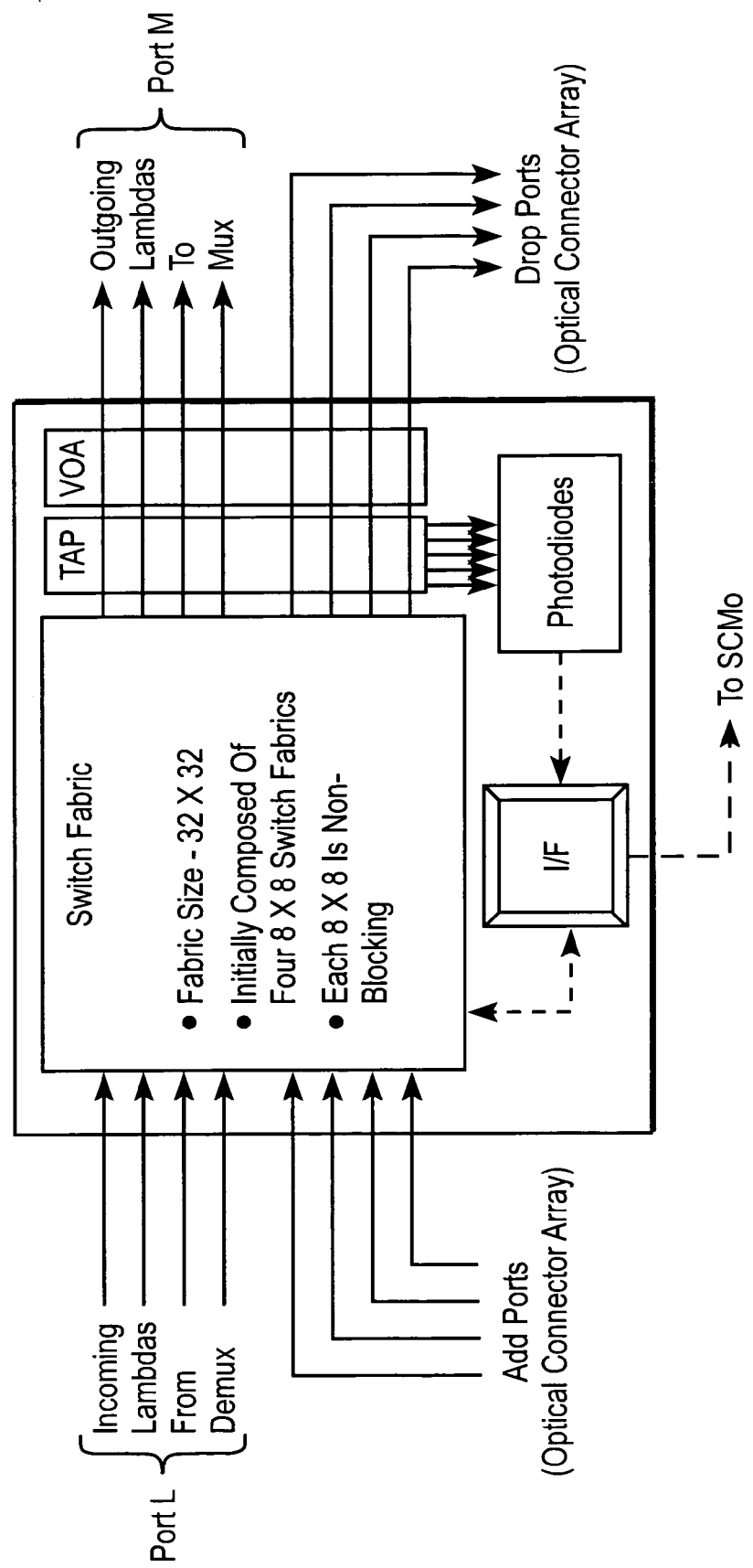
FIG. 13 is a block diagram illustrating an exemplary WSM that may be mounted onto a backplane according to one embodiment of the invention.

FIG. 13 is a block diagram illustrating an exemplary WSM that may be mounted onto a backplane according to one embodiment of the invention. The exemplary WSM may be implemented as any one of WSMs 412–421 of FIG. 4. The exemplary WSM may be used to perform optical wavelength switching operations.

In one embodiment, a wavelength switch module (WSM) includes at 32 inputs and 32 outputs. More or less inputs may be implemented dependent upon the specific configuration. Initially, the switch will likely be blocking, which may include four 8 inputs×8 outputs optical switch fabrics, each of which is strictly non-blocking within itself. Each 8×8 switch fabric may be dedicated to a single wavelength.

A WSM is the module that actually implements call set-up and tear down requests. The WSM allows the redirection of 'through' signals that are incoming on one network fiber (i.e. incoming from any OAF) to exit on any of one the outgoing network fibers (e.g., sent to any OAF). Depending on the degree of connectivity (i.e. the number of OAFs), some of the input SM ports can be connected to 'ADD' channels and a corresponding number of output WDM ports can be connected to 'DROP' channels.

The WSM also provides the ability to power adjust the optical signals so that they are at the correct power level when they leave the OAF. A known level is required to ensure that the proper signal to noise ratio (OSNR) is maintained across all channels. The VOA settings will differ from channel to channel due to differences in path loss (e.g. connector loss, switch loss) and time-varying effects. It needs to be adjusted quickly when it is first set up and then updated infrequently thereafter. In order to minimize the amount of effort spent adjusting the VOA, the control loop will only make a change the VOA setting is off by more than about 0.5 dB. The feedback that provides information to control the VOA setting comes from the OCM on the OPM module.

The WSM also contains optical "taps" that send 5% of the signal to monitor photodiodes. The purpose of the photodiodes is to indicate presence or absence of signal for diagnostic or protection switching purposes. Use of these photo detectors for detecting the presence and absence of signals (e.g. Loss of Signal, LOS) will be faster than relying on the OCM/OPM and will be key for us to ensure the fastest recovery optical signals possible.

Referring back to FIG. 12, once switched the output signals are fed to the output stage of the OAF. This module (e.g., OAF) must combine all the signals into a single multiplexed stream and amplify it prior to delivery to the network fiber.

The goal of the booster amp is to compensate for the loss of the system itself. This is a known value, set by design. This amplifier does not need to have dynamic gain capability. The quality of the multiplexer function (mux) does not have to have the same isolation characteristics as the demultiplexing function (demux).

There is another optical tap that allows the output from the booster amplifier to be sent to the OPM. The OSC signal is added after the optical amplifier to signal the downstream node. Since each OAF is responsible bi-directional traffic, a single OSC transmitter/receiver (Tx/Rx) module can be used. The data rate used by the OSC is planned to be 1000 Mbps and use Ethernet protocols.

Both the pre-amp and booster EDFAs have self-contained control electronics that continuously adjust internal components. From a control perspective, the system can configure the EDFAs (e.g. turning the EDFA off for safety reasons) and read current status from the EDFA. There should be no need to poll for this information very frequently. The EDFAs also have alarm pins that change state in case of over temperature, loss of signal, etc. These pins do need to be monitored to ensure rapid response to failure conditions.

The mux and demux AWGs selected require heating to stabilize the center frequencies to +/− few GHz to the ITU grid. The control circuitry for this is included internal to the AWG package.

Note that the two EDFA optical amplifiers (the pre-amp and the booster) are electrically connected via the "automatic Power Reduction" (APR) module. It is designed to protect craft personnel working with fiber ends exposed. The output from an optical amplifier is high enough to cause damage to human eyes under adverse conditions. The standardized way to deal with this is APR. APR assumes that links are always bi-directional. Basically, whenever the pre-amp detects a loss of signal, it will turn off the corresponding booster. The APR process and reset details can be found in ITU G.664.

In one embodiment, there are three types of monitoring that are being done on signals generated in the OAF modules:

1. The total average power is being monitored by the EDFA—this provides an indication of fiber continuity. Response time is~few msec. This is performed within the optical amplifier module.
2. The optical power received by the OSC is being continuously monitored. This provides another indication of fiber continuity. Response time is few microseconds.
3. A portion of the signal is also sent to a Optical Performance Monitor (OPM).

The OPM performs both fast and slow analysis on the incoming and outgoing DWDM signals.

Figure 15:
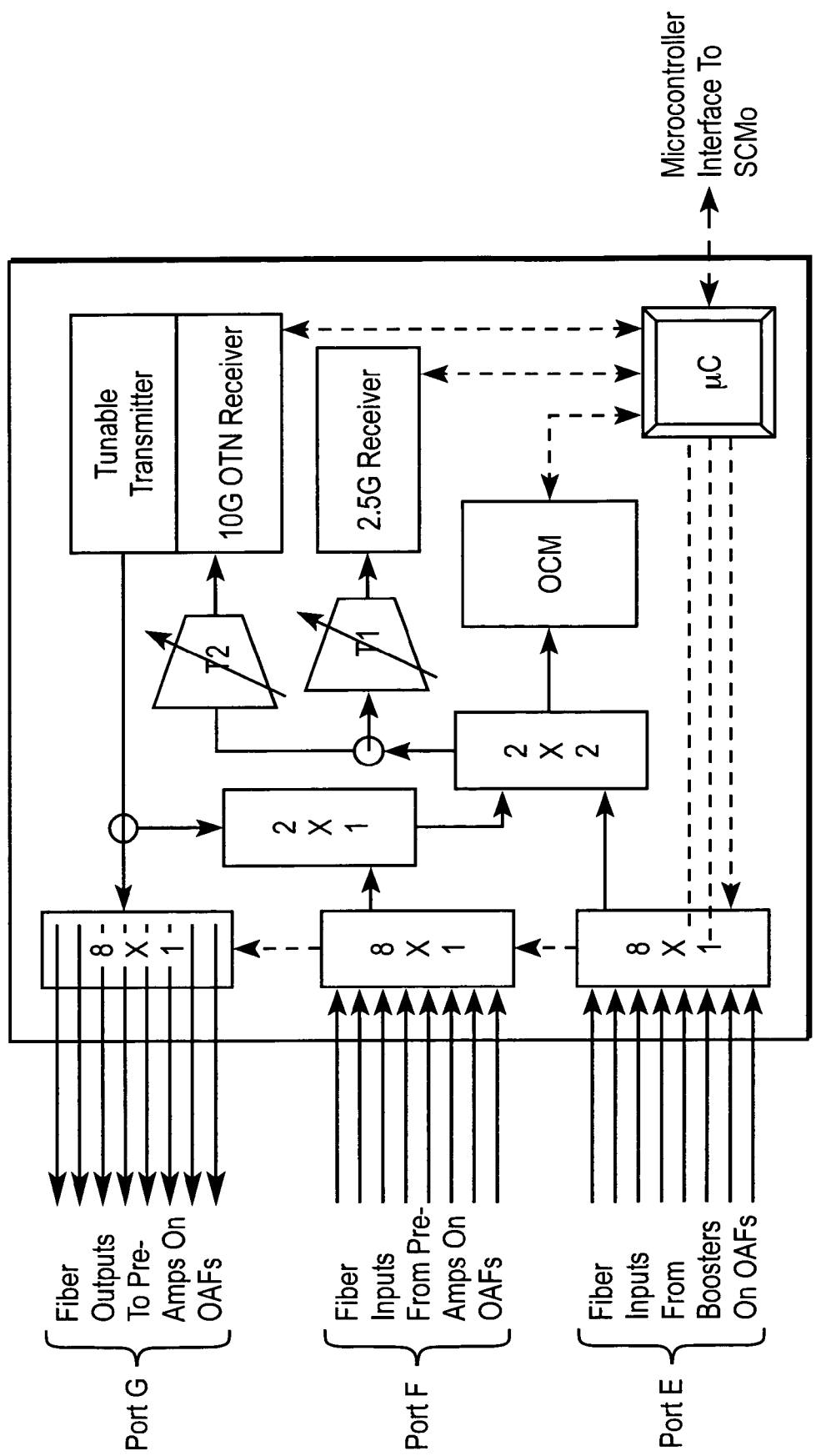
FIG. 15 is a block diagram of an OPM module according to one embodiment of the invention.

FIG. 15 is a block diagram of an OPM module according to one embodiment of the invention. The exemplary OPM module may be implemented as OPM module 410 of FIG. 4. The OPM module is an instrument grade module and, as it will be relatively expensive, is expected to be shared among a number of ports. The ports to be looked at are selected by an Nx1 optical switch. The channel to be looked at is selected by two tunable filters. The output from one tunable filter is sent to a 10 G OTN receiver to analyze the signal properties. The output form the second filter is sent to a 2.5 G receiver. The tests are under the control of a microprocessor (e.g., uC) which coordinates the 8×1, 2×2 and 2×1 switches, tunable filter settings, collection and storage of the data.

In one embodiment, the functionality of an OPM includes at least one of the following:

1. To provide the source and detection mechanisms to participate in LMP processes for discovery and fault isolation
2. To provide emergency diagnostic capabilities, including:
   a. Ability to absolutely confirm identity of specific optical signals
   b. Ability to confirm presence of signals on incoming or outgoing fibers
   c. Ability to determine relative 'health' of a signal transiting the node
3. To provide feedback signal to allow proper VOA setting
4. To gather longer term information relating to health of system, including:
   a. Confirm laser center frequency within spec
   b. To confirm filter center frequency within spec
   c. To confirm tunable dispersion compensation set appropriately The OCM is a self-contained module that can provide information about the wavelengths and power of up to 40 channels on a single fiber. They are typically fairly fast devices, completing a scan in under 1 second. The OCM would be used to realize functions 2b, 3 and 4a above. The OCM would be used primarily for the VOA function and to confirm that the right number of signals is present on the egress. Hence, most of the time, the OCM will be connected by the 2×2 switch to the 'fiber input from booster' fibers.

The 8×1 and 2×2 switches to can be used to select a network fiber to look at in a particular direction (either outgoing or incoming). Note that because of the 2×2 operation, the OCM and the tunable receivers look at independent fibers/direction subject to the constraint that they cannot simultaneously view the same direction (incoming or outgoing). The 2×1 switch is used to allow the module to perform self-test and self-calibration.

The tunable filters, T1 and T2 allow independent selection of wavelengths on the same incoming fiber. The outputs form the tunable filters are directed to a 2.5 G receiver and an OTN 10 G receiver, respectively. These receivers are thus able to 'silently' perform an O/E conversion on the optical channels without impacting service. The intent is only to look at header information contained in the signal—these receivers have no ability to inspect or process the data carried by the signal. The functions that the receivers provide are (1) to inspect the header to confirm the signal origin and destination (e.g. Section Trace), (2) to perform system quality analysis on the 10 G signal inferred from electronic compensation circuitry, (3) measure power at the null between wavelength peaks and (4) participate as a receiver for LMP purposes.

The measurement time for the detailed diagnostic is going to be about a minute. In contrast to the OCM, the tunable filters and receivers (2.5 G and 10 G) would primarily be looking at signals on the ingress side. We make use of this to reduce component count. There is no need for the OCM and detailed measurements to occur on the same fiber simultaneously. As configured, the OCM looks at egress and the detailed diagnostics at egress. Hence a 2×2 switch can be used to separate them, but still allow access to the 'other direction' when the situation demands.

The tunable transmitter is used to provide a source of DWDM signals that can be injected into the DWDM signal ahead of the demux stage. This can be used for internal diagnostics/fault isolation as well as serving as a light source for LMP purposes. Note that this feature must be used with care as it can interfere with existing signals if the light from this transmitter is inserted into the wrong fiber/wavelength combination.

As an example of the operation of the detailed diagnostic function, the narrower T1 filter can determine whether the source lasers and any preceding filters are at their correct center frequency. If the source and filters are offset from each other too far (~tens of GHz), the signal will be distorted and impaired.

Independently, the T2 filter can select a particular 10 G channel to characterize. The channel will be received by the OTN receiver. The goal of the receiver is to measure the OSNR and amount of distortion present in the signal at that point in the network. The receiver will be able to adjust slice levels to make noise determinations and slice time to make distortion measurements. It can also take a look at the header to confirm source and destination. (Note: the ability to measure large values of OSNR is not important—real need is to measure OSNR<20 dB. OSNR will include contributions from optical amps as well as crosstalk from all sources).

The resulting information (center frequency of source, effective center frequency of the preceding AWGs, amount of signal noise, OSNR, amount of signal distortion, Bit error rate, date and time) should be stored for long term trend analysis. This information will be used to perform analysis to identify source of signal impairments over time, where 'time' is measured in months.

Thus, an optical backplane system has been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An optical backplane system, comprising:
a backplane to interconnect a plurality of optical modules including a plurality of optical amplifier and filter (OAF) modules mounted on the backplane to perform amplification and filtering operations of optical signals, each of the OAF modules is plugged into a slot and removable from the respective slot individually; and
a plurality of fiber interface modules (FIMs) having a back end inserted into a plurality of slots of the backplane respectively, each FIM having a front end to receive an incoming fiber carrying incoming optical signals and an outgoing fiber carrying outgoing optical signals from and to an optical network,
wherein the back end of the FIM extends the incoming and outgoing fibers to at least one of the plurality of optical modules mounted via the backplane, and wherein each of the fibers is capable of carrying a plurality of wavelengths of optical signals.

2. The system of claim 1, wherein the front end of each FIM includes a first port to receive the incoming fiber and a second port to receive the outgoing fiber, such that a user is able to plug in the incoming fiber and the outgoing fiber at the front end of the FIM without having to reach one of the back end of the FIM and the backplane.

3. The system of claim 1, wherein the FIMs are arranged in a row having the plurality of slots and each of the FIMs is removable from the respective slot individually.

4. The system of claim 1, wherein each OAF module receives the incoming and outgoing fibers from a corresponding FIM of the plurality of FIMs via the backplane.

5. The system of claim 4, wherein each OAF module has a front end and a back end, back end being inserted into the respective slot to couple the incoming and outgoing fiber via the backplane without connecting the fibers at the front end.

6. The system of claim 1, wherein each OAF module comprises a demultiplexer to demultiplex the plurality of wavelengths received from the incoming fiber, wherein each OAF module transmits the demultiplexed wavelengths to other optical modules via the backplane.

7. The system of claim 6, wherein the demultiplexed wavelengths are carried via a plurality of fibers through the backplane, each of the plurality fibers carrying one wavelength respectively.

8. The system of claim 6, further comprising a plurality of wavelength switch modules (WSMs) mounted on the backplane to perform wavelength switching operations of the optical signals, each of the WSMs is plugged into a slot and removable from the respective slot individually.

9. The system of claim 8, wherein each of the WSMs receives a plurality of demultiplexed optical signals from one or more OAF modules via the backplane using a plurality of fibers, each of the fibers carrying one wavelength.

10. The system of claim 9, wherein each of the WSMs receives up to four demultiplexed optical signals from a plurality of OAF modules via the backplane, the demultiplexed optical signals being represented by a wavelength carried within an individual fiber.

11. The system of claim 8, wherein each of the WSMs performs optical switching and transmits the switched optical signals to one or more OAFs via the backplane, each of the switched optical signals is carried by a wavelength within an individual fiber.

12. The system of claim 6, further comprising an extended (XTR) module inserted into a slot of the back plane and removable from the slot, XTR module interconnecting the optical modules mounted on the backplane with at least one of other electrical modules mounted on the backplane and other modules mounted on another backplane.

13. The system of claim 12, wherein the XTR module receives at least a portion of the demultiplexed optical signals from one or more OAFs via the backplane and transmits the demultiplexed optical signals to other modules, each of the optical signals being represented by a wavelength within an individual fiber.

14. The system of claim 13, wherein the XTR module includes a front end and a back end, wherein the demultiplexed optical signals are received from the OAFs at the back end via the backplane, and wherein the demultiplexed optical signals are transmitted to other modules via the front end of the XTR module.

15. The system of claim 14, wherein the back end of the XTR module has an interface physically compatible with a back end of an OAF module, such that the XTR module is capable of being inserted into a slot of an OAF module.

16. The system of claim 1, wherein each OAF module comprises a multiplexer to multiplex the plurality of wavelengths received from other optical modules via the backplane, wherein the multiplexed wavelengths are carried via a fiber via the backplane to the outgoing fiber of a corresponding FIM.

17. The system of claim 1, wherein each OAF module further comprises an interface to redirect substantially all wavelengths of incoming and outgoing fibers to an optical performance monitor (OPM) module through the backplane.

18. The system of claim 17, wherein each OAF module further comprises an interface to receive a diagnostic signal from the OPM module via the backplane.

19. The system of claim 1, further comprises an optical performance monitor (OPM) module inserted into a slot of the backplane and removable from the slot, wherein the OPM module receives multiplexed optical signals from each of the OAFs via the backplane, each of the multiplexed signal from an OAF being carried as a wavelength within a fiber.

20. The system of claim 19, wherein the multiplexed optical signals includes multiplexed incoming and outgoing optical signals from and to the optical network.

21. The system of claim 19, wherein the OPM module further transmits a diagnostic signal to each of the OAFs via the backplane for diagnosing the respective OAF, the diagnostic signal being carried as a wavelength within an individual fiber coupled to the respective OAF.

22. An optical backplane system, comprising:
a backplane;
a plurality of fiber interface modules (FIMs) mounted on the backplane, each of the FIMs having a front end to receive an incoming fiber for receiving multiplexed optical signals from an optical network and an outgoing fiber for transmitting multiplexed optical signals to the optical network, and each of the FIMs having a back end that extends the incoming and outgoing fibers to the backplane without performing significant processing operations;
a plurality of optical amplifier and filter (OAF) modules mounted on the backplane to perform amplification and filtering operations on the optical signals, each of the OAFs receiving the incoming multiplexed optical signals from a respective FIM via the backplane and transmitting the outgoing multiplexed optical signals to the respective FIM via the backplane, and each of the OAFs demultiplexing the multiplexed optical signals into demultiplexed optical signals represented by a wavelength; and
a plurality of wavelength switch modules (WSMs) mounted on the backplane to perform wavelength switching operations, each of the WSMs receiving a portion of the demultiplexed optical signals from each of the OAFs via the backplane, performing wavelength switch operations on the optical signals, and transmitting the corresponding switched optical signals to each of the OAFs via the backplane.

23. The system of claim 22, wherein the plurality of FIMs are inserted into a plurality of slots of the backplane arranged in a row, each of the FIMs is removable from the respective slot independently.

24. The system of claim 22, wherein the plurality of OAF modules are inserted into a plurality of slots of the backplane arranged in a row, each of the OAF modules is removable from the respective slot independently.

25. The system of claim 22, wherein the plurality of WSMs are inserted into a plurality of slots of the backplane arranged in a row, each of the WSMs is removable from the respective slot independently.

* * * * *